Patented July 26, 1932

1,868,913

UNITED STATES PATENT OFFICE

EUGENE L. PRIZER, OF SOLANA BEACH, AND JOHN A. PRIZER, OF FULLERTON, CALIFORNIA, ASSIGNORS OF ONE-THIRD TO SAID EUGENE L. PRIZER, ONE-FOURTH TO SAID JOHN A. PRIZER, ONE-FOURTH TO DONALD C. JONES, OF FULLERTON, CALIFORNIA, AND ONE-SIXTH TO HARRY G. NUTT, OF ALTADENA, CALIFORNIA

METHOD OF SUPPLYING SOLUBLE FERTILIZING AGENTS TO SOIL

No Drawing. Application filed April 5, 1930. Serial No. 442,032.

This invention relates to the application of soluble fertilizing agents to soil used for agricultural purposes, and particularly to the application of such fertilizing agents by dissolving the same in the water to be used for irrigation of such soil and then delivering the water containing such agents in solution to the soil in substantially the same manner as in ordinary irrigation. This manner of introducing such fertilizing materials has been found very advantageous because of the simplicity thereof and the minimum amount of handling or manual transportation of fertilizing materials required, due to utilization of the irrigation water as a means of transporting the fertilizing materials, and furthermore, because the fertilizing materials are carried by the irrigating water into the soil so as to promote thorough distribution thereof and intimate contact thereof with the roots of growing vegetation.

The principal object of this invention is to provide a method for supplying soluble fertilizing agents to soil in the general manner above mentioned, but under such conditions as to cause more uniform distribution and application of the fertilizing agent throughout the soil in the area being treated, than has heretofore been the case.

The common forms of irrigation to which our invention is particularly applicable may be referred to in general as surface irrigation methods, in which the water is delivered through pipe lines or open ditches or other means to one end of each of a series of open furrows or ditches extending in parallel lines or otherwise across the region to be irrigated, or to segregated areas, basins, or "checks" suitably distributed over such region, and is caused to flow along such open furrows or ditches or over the surface of such areas, basins, etc., to irrigate the soil throughout such region. In attempting to deliver soluble fertilizing agents to the soil, by dissolving the same in the irrigating water, and by distributing such irrigating water by the above described surface irrigation methods, it has been found that there is a marked tendency for the fertilizing agents to be removed from solution in the irrigating water by contact with the soil in the portions of the furrows or areas with which the water first comes in contact, due to absorption, adsorption or other action, so that the concentration of fertilizing agent in the irrigating water gradually diminishes in the direction of flow along the furrow or over the surface, resulting in a much heavier application of fertilizing agent to the soil adjacent the upper ends or first portions of the furrows or areas than to the soil adjacent the lower ends or latter portions thereof. Such unequal application of the fertilizer is obviously disadvantageous since it either leads to insufficient fertilization of the soil adjacent the lower portions of the furrows or areas or else requires the use of an excessive amount of fertilizing agent to insure adequate fertilization of the entire region. Furthermore, when the latter measure is resorted to, the fertilizer may in some cases be supplied in excessive amounts to the soil adjacent the upper portion of the furrows or areas so as to actually injure the soil or the vegetation growing thereon.

In previous work along this line the fertilizing agents have been dissolved in the irrigating water at relatively high concentrations, either by manual introduction thereof into the irrigating water or by introduction thereof through suitable automatic feeding apparatus, but as above stated, it has been generally found that application of such agents in such relatively high concentrations has led to the inequality of distribution along the length of the furrows or over the irrigated surface areas, as above described. We have found, however, that reduction in the concentration of fertilizing agent in the water is an effective means of increasing the uniformity of distribution thereof and that if the concentration of fertilizing agent be kept relatively low and preferably below certain approximate concentrations as hereinafter set forth, the concentration thereof in the water remains comparatively uniform throughout its travel over the surface of the soil, so that if the irrigation is so carried out as to cause substantially equal application of water to the soil throughout the length of the furrows or over the entire surface of the areas or basins, the application of the fertilizing agent will also be substantially uniform throughout the length of the furrows or over the entire surface of the areas or basins, and hence throughout the entire region being treated.

More specifically, the method of our present invention consists in supplying a soluble fertilizing agent to irrigating water in such amounts as to provide a concentration of such agent not exceeding about 2,000 parts per million and preferably between 300 and 1500 parts per million, and then delivering such irrigating water to the surface of the soil, as in open furrows or areas and causing the same to flow throughout the length of such furrows or over such areas. When the concentrations of fertilizing agent are maintained below the value of 2000 parts per million, and particularly when such concentration is maintained between 300 and 1500 parts per million, the variation in concentration of the fertilizing agent in the water at different points along the path of flow of the water has been found to be relatively small as compared to the variation occurring when materially higher concentrations are used, as has been customary in the past. We are not positive as to the reason for the existence of this uniformity of concentration at these relatively low concentrations and the non-uniformity of concentration at relatively high concentrations and do not wish to be restricted to any particular theory of operation as an essential limitation of our invention, but would say that the difference may be explained on the assumption that the adsorption or absorption or other action of the soil in removing the fertilizing agent from solution, is much more rapid at relatively high concentrations, and that such adsorption or absorption or other action occurs to a much less extent at relatively low concentrations, due either to slower rate of action or to the establishment of equilibrium between the concentration of the fertilizing agent in the water and the ability of the soil to adsorb or absorb or otherwise remove such agent from solution.

A number of tests were made on the application of fertilizing agents to soil, by solution thereof in the irrigating water and distribution of such irrigating water by surface irrigation methods, in order to determine the comparative results for different concentrations of fertilizing agent. In some of these tests the concentration of fertilizing agent was relatively high and of the same order as has been customarily employed in previous operations, while in other tests the concentration was materially decreased and maintained within the limits above mentioned. A series of such tests were made in an open furrow irrigation system. In each case, samples of the irrigating water were taken at four points spaced along the length of the furrow and designated as stations 1 to 4 inclusive, and in each test at least eight samples of the water were taken at each station, and composites of all such samples at each station were analyzed to determine the concentration of fertilizing agent therein. The furrow was approximately 200 feet long. Station 1 was near the upper end of the furrow, Station 4 near the lower end thereof, and Stations 2 and 3 were spaced substantially equally therebetween.

The following table presents the results obtained in a series of such tests. In these particular tests the fertilizing agent employed was ammonium sulphate, but similar results have also been obtained with other soluble fertilizing agents.

Table showing variation in concentration of ammonium sulphate in irrigation water (parts per million)

| Test No. | Station number | | | | Average concentration | Maximum deviation from average concentration | Mean deviation from average concentration |
|---|---|---|---|---|---|---|---|
| | 1 | 2 | 3 | 4 | | | |
| | | | | | | Per cent | Per cent |
| A | 52,500 | 36,100 | 29,100 | 22,000 | 34,925 | 50.4 | 26.8 |
| B | 8,059 | 5,885 | 5,432 | 4,074 | 5,862 | 37.5 | 17.7 |
| C | 808.2 | 829.5 | 869.4 | 850.4 | 839.3 | 3.7 | 2.4 |
| D | 413.8 | 431.8 | 382.0 | 383.2 | 402.7 | 7.2 | 5.0 |
| E | 146.2 | 180.0 | 172.3 | 168.0 | 166.6 | 12.2 | 6.1 |

It will be noted that in Tests A and B, where the initial concentrations of the fertilizing agent were high, and of the same order as the concentrations heretofore ordinarily used, the concentration decreased very markedly from Station 1 to Station 4. Under these conditions, if the irrigation were continued only long enough to supply the correct amount of fertilizer to the soil adjacent the upper end of the furrow, the soil adjacent the lower end of the furrow would receive much less than the correct amount, while, if it were continued long enough to adequately fertilize the lower portion, the upper portion would receive an excess, which would not only be wasteful but might actually injure the soil or vegetation growing thereon. However, in Tests C and D, where the initial concentrations were well below 2000 parts per million and within the limits of 300 to 1500 parts per million, the concentration remained much more nearly uniform throughout, as shown by a comparison of the figures maximum and means deviations from average concentration, and it is therefore possible to secure much more uniform fertilization and more efficient use of the fertilizing agent. In Test E, where the concentration was still lower, the variation was for some reason somewhat greater than in Tests C and D, but was still much less than in Tests A and B.

In making Test A, the fertilizing agent was supplied to the water by hand, and this method of application may be suitable in some cases, but it will be understood that in practice, and particularly in large scale operations, it will be preferable to feed the fertilizing agent into the water by automatic feeding or supplying means, such as described for example in application of Eugene L. Prizer, Ser. No. 436,489, filed March 17, 1930, and such means of application were employed in Tests B, C, D and E.

The maintaining of the concentration of fertilizing agent in the water within the limits above set forth has been found not only to preserve a more nearly uniform concentration in the water throughout the path of flow thereof over the surface, but also to cause a much more uniform increase in content of the fertilizing agent in the adjacent soil, provided the irrigation is so conducted as to cause substantially equal application of water, containing such fertilizing agent in solution, to the ground throughout the length of the path of flow thereof. By this means, therefore, we are enabled to secure substantially uniform application of the fertilizing agent to the soil over the entire area being treated.

We claim:

1. The method of supplying a soluble fertilizing agent to soil which comprises dissolving such fertilizing agent in irrigating water so as to provide a concentration thereof not exceeding 2000 parts per million, and then delivering such irrigating water containing said fertilizing agent in solution to the surface of the soil and causing the same to flow in contact therewith.

2. The method of supplying a soluble fertilizing agent to soil which comprises supplying the soluble fertilizing agent to irrigating water at such a rate as to provide a concentration thereof between 300 and 1500 parts per million and then delivering such irrigating water to the soil by causing the same to flow in contact with the surface thereof, the concentration of said fertilizing agent being sufficiently low to cause such concentration to remain substantially uniform throughout the flow of the water in contact with the surface of the soil.

3. In surface irrigation methods, the step which comprises dissolving a soluble fertilizing agent in the water before delivery of such water to the surface of the soil and maintaining the concentration of such fertilizing agent below 2000 parts per million and sufficiently low to cause such concentration to remain substantially uniform throughout the period of contact of the water with the surface of the soil.

4. In surface irrigation methods, the step which comprises dissolving a soluble fertilizing agent in the water before delivery of such water to the surface of the soil and maintaining the concentration of such fertilizing agent below 1500 parts per million.

5. The method of supplying a soluble fertilizing agent to soil which comprises dissolving such an agent in water and then delivering such water containing said agent in solution to the surface of the soil and causing the same to flow in contact therewith, while so controlling the rate of solution of said agent in said water as to maintain a concentration of fertilizing agent not exceeding 1500 parts per million in the water delivered to the soil throughout such operation.

In testimony whereof we have hereunto subscribed our names this 27th day of March, 1930.

EUGENE L. PRIZER.
JOHN A. PRIZER.